(12) United States Patent
George

(10) Patent No.: US 8,994,354 B2
(45) Date of Patent: Mar. 31, 2015

(54) ELECTRONIC POWER CONVERTER WITH GROUND REFERENCED LOSSLESS CURRENT SENSING

(71) Applicant: Cooper Technologies Company, Houston, TX (US)

(72) Inventor: Mark Steven George, Wilsonville, OR (US)

(73) Assignee: Cooper Technologies Company, Houston, TX (US)

( * ) Notice: Subject to any disclaimer, the term of this patent is extended or adjusted under 35 U.S.C. 154(b) by 166 days.

(21) Appl. No.: 13/793,464

(22) Filed: Mar. 11, 2013

(65) Prior Publication Data

US 2014/0254220 A1    Sep. 11, 2014

(51) Int. Cl.
  *G05F 1/00* (2006.01)
  *G05F 1/46* (2006.01)
  *H02M 7/217* (2006.01)

(52) U.S. Cl.
  CPC ........ *G05F 1/46* (2013.01); *H02M 7/217* (2013.01)
  USPC .......................................... 323/285; 323/282

(58) Field of Classification Search
  USPC ......... 323/273, 275–277, 285, 312, 315, 316; 363/21.09, 21.17, 56.12, 75, 76, 78–80
  See application file for complete search history.

(56) References Cited

U.S. PATENT DOCUMENTS

| | | | |
|---|---|---|---|
| 6,441,597 B1 | 8/2002 | Lethellier | |
| 6,469,481 B1 * | 10/2002 | Tateishi | 323/282 |
| 7,508,182 B1 * | 3/2009 | Chang | 323/282 |
| 2005/0128005 A1 * | 6/2005 | Li et al. | 330/297 |
| 2008/0252227 A1 * | 10/2008 | Buij | 315/224 |
| 2010/0231187 A1 * | 9/2010 | Wicht et al. | 323/282 |
| 2012/0176110 A1 * | 7/2012 | Ho et al. | 323/282 |

* cited by examiner

*Primary Examiner* — Adolf Berhane
*Assistant Examiner* — Gary Nash
(74) *Attorney, Agent, or Firm* — Armstrong Teasdale LLP

(57) ABSTRACT

A current sensing circuit for an electronic power converter having an inductor that is not referenced to ground is configured to provide an output signal that is referenced to ground and is proportional to the current flow between the inductor and a load in an electrical power system. The current sensing circuit includes outputs associated with a voltage of the inductor, a current source circuit, a current steering circuit responsive to the voltage outputs and a level shifting circuit.

30 Claims, 1 Drawing Sheet

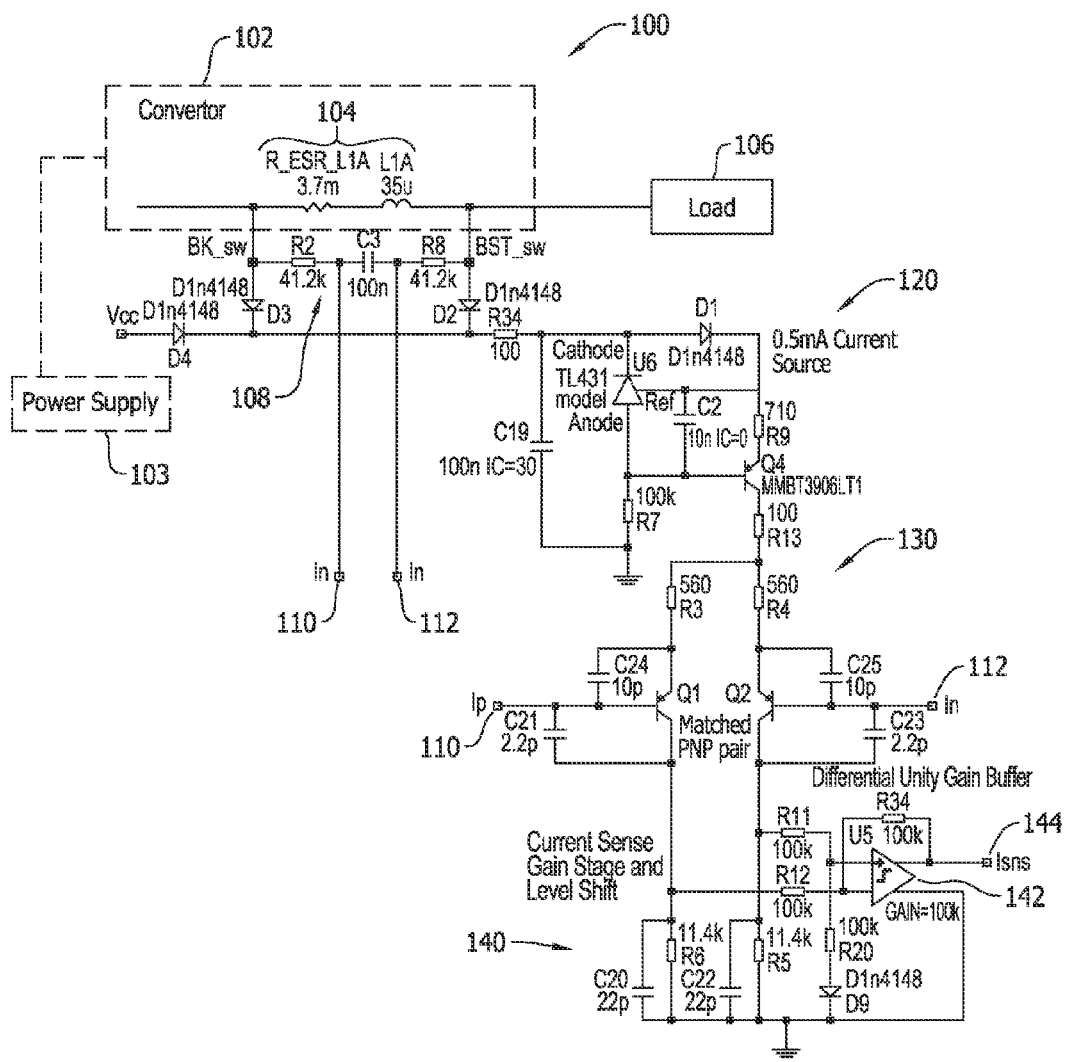

ELECTRONIC POWER CONVERTER WITH GROUND REFERENCED LOSSLESS CURRENT SENSING

BACKGROUND OF THE INVENTION

The field of the invention relates generally to electrical power systems and converter circuitry therefore, and more specifically to electronic power systems including electronic power converter circuits including an averaging inductor.

Electronic power converters are known and in widespread use to convert electrical energy from one form to another. For example, power may be converted from a first direct current (DC) voltage to another direct current (DC) voltage, commonly referred to as a DC to DC voltage conversion. Power may also be converted from a first alternating current (AC) voltage to another direct current (DC) voltage using converter circuitry, commonly referred to as a AC to DC voltage conversion. Hence, power converters are often referred to as DC to DC power converters or AC to DC power converters.

Some types of electronic power converters include an inductor, sometimes referred to as an averaging inductor, that stores and releases electrical energy to and from the circuit. Such converters including power inductors are utilized in, for example, switched mode power supply systems that are electronically controlled and supply power, for example, to a variety of handheld electronic devices having an ever increasing number of features. As current flows through a winding in the inductor, the current flow generates a magnetic field that may be stored as magnetic energy in a magnetic core of the inductor. The stored magnetic energy may likewise induce current flow in the inductor and return electrical energy back to the circuit. For this reason, such power converter circuits and inductor components are sometimes referred to as power magnetics. Power magnetic converters may include, for example, boost converters, buck converters, and fly-back converters.

Certain types of known power magnetic converters are problematic in certain aspects and improvements are desired.

BRIEF DESCRIPTION OF THE DRAWINGS

FIG. 1 is an exemplary schematic of a ground referenced lossless current sensing circuit for an electronic power magnetic converter.

DETAILED DESCRIPTION OF THE INVENTION

In power magnetic converters it is desirable for a number of reasons to monitor a current flow through an inductor that is output from the converter circuitry to a load. Various techniques are known for sensing current output from an inductor. In certain types of power magnetic converters, the voltage of the inductor may float with respect to ground. In other words, the voltage of the inductor is some types of magnetic converters are not referenced to electrical ground. As such, simple attempts to sense the current output from the inductor are not particularly useful because the current sensed will not be referenced to ground either. As a result, while changes in current flow can be reliably detected, the magnitude of the current flow cannot. This renders known current sensing techniques problematic or disadvantageous in certain aspects.

In certain types of power converters, including but not limited to buck converters, current transformers have been utilized to sense current output from the inductor. The current transformer includes a primary winding and a secondary winding having a different number of turns. The secondary winding may therefore output a scaled (and typically much smaller) current than the primary winding. The secondary winding output may then be rectified and amplified to provide a voltage signal that is proportional to the output current of the inductor for control purposes. In some types of known converters having a switched power supply output, the secondary winding output signal may be rectified while the switch is "On", and while the switch is "Off" the transformer core is allowed to reset. Consequently, in such applications, current is sensed in one direction only (in a direction from the inductor to the load) rather than bidirectionally.

While current transformers can be effective to sense the output current of the inductor, they are limited in some aspects and disadvantaged in others. For example, current transformers may only be used with AC circuitry, and thus cannot be used to sense output from a DC converter. The current sensor is disadvantaged due to size constraints.

In other types of known power converters, a resistor is connected in series with the inductor output, and current flowing through the resistor generates a voltage across the resistor that is sensed. Unlike a current transformer, such series resistor sensing may be utilized in both AC and DC converters. In high power, high current conversion applications, however, the series resistor undesirably creates relatively high power losses. Series resistor sensing techniques are not very useful when the inductor being monitored is not referenced to ground. Also like the current transformers, the series resistor adds cost and expense to the converter circuitry.

In still other types of known power converters, low side MOSFETs that already exist in the converter circuitry may be utilized to sense current in the primary of the transformer. Many different topologies of such converter circuits including MOSFET switching elements exist, and only some of them effectively allow current sensing with a MOSFET. While boost converter and fly-back topologies typically are referenced to ground, floating topologies such as buck converters typically are not. Thus, MOSFET current sensing can be utilized in some types of converters but not for others.

Exemplary embodiments of electrical power systems including converter circuitry are described hereinbelow that overcome these and other disadvantages in the art. Specifically, a practically universal current sensing circuitry is disclosed that may be beneficially used in converters having an inductor that is not referenced to ground, that is not limited to any particular converter topology, that may be used in AC and DC converter applications, that may operate in high power conversions in essentially a lossless manner, that may sense bidirectional current flow, and that may be provided in an economical manner. As described below, this is achieved at least in part with a current sensor circuit utilizing an inductor's parasitic elements and a level shifting circuit to make an output signal referenced to ground. Method aspects will be in part apparent and in part explicitly discussed below.

Turning now to the schematic of FIG. 1, a portion of an electrical power system 100 is shown including a power supply 103, a power converter circuit 102 having an inductor 104 and a load 106. The inductor 104 in the converter circuit 102 is represented as R_ESR_L1A and L1A that model a simple magnetic inductor where R_ESR is the resistance of the wire conductor used to fabricate the winding or coil in the inductor 104 and L1A represents the inductance. In different embodiments, the converter circuit 102 may be configured with electronic control elements and other circuit elements operative to convert electrical energy from a power supply 103 that is input to the converter circuit 102 in one form and provide an output supplying electrical energy to the load 106 in another form suitable to drive the load 106.

The power supply 103 in different embodiments may be an AC or DC power supply providing a first voltage to the converter circuit 102, with the converter circuit 102 providing a DC output voltage to the load 106 at a second voltage suitable for driving the load 106. The second voltage may be higher or lower than the first voltage depending on the application. The converter circuit 102 may be configured as a boost converter, a buck converter, a fly-back converter or any other converter having an inductor 104 that is not referenced to ground and as such has a floating voltage in operation. The converter circuit 102 in general may have any topology desired. As converter circuits are well known and understood in the art, further description thereof is omitted except in relation to current sensing aspects for the inductor output as described below.

The inductor 104 in the converter circuit 102, according to well-known principles, stores and releases energy to the converter circuit 102 and/or to a load 106 connected to the inductor 104. The current flowing from the inductor 104 to the load 106 is referred to herein as the inductor output. The load 106 may, in various embodiments correspond to components of a portable or non-portable device, including hand-held electronic devices. The load 106 in other embodiments may be associated with a vehicle electrical power system. Various adaptations are possible for the power system 100 to supply power to the load 106 via the power converter circuit 102. Further, the converter circuit 102 is operable with a variety of different power supplies, including but not limited to vehicle battery power supplies.

It is desirable for the output current from the inductor 104 to be monitored for a number of reasons relating to the load 106 and operation of the converter circuit 102. Because the voltage of the inductor 104 floats as the circuit 102 operates, however, it is necessary to obtain a current reading that is referenced to ground in order to evaluate the magnitude of the current actually being output to the load 106 at any given point in time.

As shown in FIG. 1, an RC circuit is established in parallel with the inductor 104 and includes two resistors R2 and R8 with a capacitor C3 connected there between. The resistors R2 and R8 are matched with an equal resistance of 41.2 k ohms in the exemplary embodiment shown, and therefore provide a balanced voltage across the capacitor C3. Voltage outputs 110 and 112 are therefore obtainable from either side of the capacitor C3. The voltage across the capacitor C3 is proportional to the current output from the inductor 104.

To reference the voltage across the capacitor C3 to ground, a current source circuit 120 is provided that outputs a current to a current steering circuit 130 that also accepts the voltage outputs 110, 112 corresponding to the voltage across the capacitor C3 of the RC circuit 108. The steering circuit 130, based on the voltage outputs 110, 112 outputs current to a level shifting circuit 140 that provides an output signal referenced to ground as explained below.

The current source circuit 120 includes a regulated current source Q4 in the form of a general purpose transistor that in the example illustrated is a transistor model number MMBT3906LT1 available from ON Semiconductor (www.onsemi.com). The current source circuit 120 also includes resistors R7, R9 and R13, capacitors C2 and C19, a regulator U6 such as programmable shunt regulator model number TL431 available from Fairchild Semiconductor (www.fairchildsemi.com), and a diode D1 connected as shown. In the example illustrated, the current source circuit 120 provides a 0.5 mA current source that is output to resistor R13 and to the connected current steering circuit 130, irrespective of any voltage placed across the current source circuit 130. In other embodiments, greater or lesser current outputs may be provided by the current source circuit 120.

The current steering circuit 130 includes matched resistors R3 and R4 connected in parallel and respectively connected to one of a matched pair of PNP transistors Q1 and Q2 such as model number PNP5201Y transistors available from NXP Semiconductor N.V. (www.nxp.com). As appreciated by those in the art, each transistor Q1 and Q2 includes an emitter, a collector and a base. In the example illustrated, the emitter of the transistor Q1 is connected to R3 and the emitter of the transistor Q2 is connected to R4. The base of the transistor Q1 is connected to the voltage input 110 (corresponding to the output 110 of the RC circuit 108), and the base of the transistor Q2 is connected to the voltage input 112 (corresponding to the output 112 of the RC circuit 108). The collector of the transistor Q1 and the collector of the transistor Q2 each provide a current output to the level shifting circuit 140, and more specifically to resistors R6 and R5.

While capacitors C21 and C24 are shown connected to transistor Q1 and while capacitors C23 and C25 are shown connected to transistor Q2 in FIG. 1, the capacitors C21, C23, C24, and C24 represent parasitic elements of the transistors Q1 and Q2 for modeling purposes. As such, in a physical embodiment of the circuit the capacitors C21, C23, C24, and C24 are built-in to the transistor components and would not be separately provided circuit elements as the schematic of FIG. 1 may appear to suggest.

The output current from each transistor Q1 and Q2 is responsive to the base-emitter voltage or the voltage input 110 and 112, respectively. Thus, as the voltage inputs 110, 112 from the RC circuit 108 fluctuate with the floating voltage across the inductor 104, the transistors Q1 and Q2 output varying amounts of current from the collectors of the transistors. The output current from each transistor Q1 and Q2 flows to the respective resistors R6 and R5 in the level shifting circuit.

The level shifting circuit 140 includes a differential amplifier 142 (also shown as U5). The voltages across resistors R6 and R5 are input to the amplifier 142, with the amplifier outputting a voltage signal 144 that is proportional to the current output from the inductor 104 and also is referenced to ground. The voltage signal 144 may be provided as a feedback control signal to a control element or a controller of the converter circuit 102 or used for other purposes.

The benefits of the circuitry described above are numerous and include at least the following.

The current sensing circuitry may be universally used in any converter having an inductor that is not referenced to ground. The sensing circuit is not limited to use with any particular converter circuit topology. The converter circuit 102 may be configured as a boost converter, a buck converter or a fly-back converter and the sensing circuit as described may be utilized in each type of converter without modification.

The current sensing circuitry may be used with AC and DC converter circuitry. That is, the converter circuit 102 in different embodiments may be a direct to current to direct current (DC to DC) converter or may be an alternating current to direct current (AC to DC) converter. The converter circuit is operable with AC and DC power without modification. Various different types of power supplies 103 may be utilized, as well as various different types of outputs may be produced by the converter circuit 102.

The sensing circuitry may operate in high power, high current convertor circuitry in a generally lossless manner.

The current sensing circuitry is capable of sensing bidirectional current flow without modification.

The current sensing circuit may be provided in an economical manner.

While exemplary active components (e.g. transistors) have been described in relation to FIG. 1 and while exemplary values for passive circuit components (e.g., resistance and capacitance values) have been described, they are exemplary only and are provided for the sake of illustration rather than limitation. Variations of equivalent circuitry using other active components and other passive components having other values (e.g., resistance and capacitance values) are possible.

The benefits of the inventive concepts described herein are now believed to have been amply illustrated in relation to the exemplary embodiments disclosed.

An embodiment of an electrical power converter has been disclosed including: power converter circuitry including an inductor, wherein the inductor is not referenced to electrical ground, and a current sensing circuit connected to the inductor. The current sensing circuit includes: at least one element arranged to have a voltage proportional to a voltage across the inductor when the power converter circuitry is operating; first and second voltage outputs associated with the at least one element; a current source circuit; a current steering circuit comprising first and second matched active elements each connected to the current source circuit and to the first and second voltage outputs, each of the first and second active elements configured to receive a current from the current source circuit and provide a current output that is responsive to the first and second voltage outputs; and a level shift circuit receiving the output from each of the first and second matched active elements and configured to provide an output signal that is referenced to ground, the output signal being proportional to a current flowing between the inductor and an electrical load.

Optionally, the at least one element includes an RC circuit connected in parallel with the inductor. The RC circuit may include a pair of resistors and a capacitor connected in between the pair of resistors. The first and second voltage inputs may be associated with the capacitor. The first and second resistors may be matched to one another.

The current source circuit may optionally include a current source and a regulator. The current source may include a general purpose transistor.

The first and second matched active elements may optionally include first and second transistors. The first and second transistors may be first and second PNP transistors.

The level shift circuit may optionally include a differential amplifier configured to provide the output signal based on the voltages associated with the respective output currents of the first and second active elements.

The converter circuitry may be configured as a direct current to direct current (DC to DC) converter. The converter circuitry is configured as an alternating current to direct current (AC to DC) converter. The converter circuitry may also be configured as one of a boost converter, a buck converter and a fly-back converter.

Another embodiment of an electrical power system for powering an electrical load from a power supply has been disclosed. The electrical power system includes power converter circuitry configured to convert electrical energy supplied to the power converter circuitry from the power supply in a first form to a second form to be supplied to a load, the power converter circuitry including an inductor connected to the power converter circuitry, wherein the inductor is not referenced to electrical ground. At least one load is connected to the inductor, and a current sensing circuit is configured to provide an output signal proportional to current flowing between the inductor and the load, the output signal being referenced to ground. The current sensing circuit includes: first and second voltage outputs associated with at least one element having a voltage proportional to the voltage across the inductor when the power converter circuit is operating; a current source circuit; a current steering circuit comprising first and second matched active elements each connected to the current source circuit and to the first and second voltage outputs, each of the first and second active elements configured to receive a current from the current source circuit and provide a current output that is responsive to the first and second voltage outputs; and a level shift circuit receiving the output from each of the first and second matched active elements.

Optionally, the at least one element may include an RC circuit connected in parallel with the inductor. The RC circuit may include a pair of resistors and a capacitor connected in between the pair of resistors. The first and second voltage inputs may be associated with the capacitor. The first and second resistors may be matched to one another.

The current source circuit may optionally include a current source and a regulator. The current source may include a general purpose transistor.

The first and second matched active elements may include first and second transistors. The first and second transistors may be first and second PNP transistors.

The level shift circuit may include a differential amplifier configured to provide the output signal based on the voltages associated with the respective output currents of the first and second active elements.

The power converter circuitry may be configured to convert as a direct current (DC to DC) converter. The power converter circuitry may also be configured as an alternating current to direct current (AC to DC) converter. The converter circuitry may be configured as one of a boost converter, a buck converter and a fly-back converter.

Another embodiment of an electrical power system for supplying power to a load has been disclosed. The electrical power system includes an electronic power converter circuit configured to convert one of direct current to direct current (DC to DC) power or alternating current to direct current (AC to DC) power. The electronic power converter circuit including an inductor that is not referenced to electrical ground, and the electronic power circuit is further configured as one of a boost converter, a buck converter and a fly-back converter. A current sensing circuit is configured to provide an output signal proportional to current flowing between the inductor and the load, with the output signal being referenced to ground. The current sensing circuit includes: an RC circuit connected in parallel with the inductor, and first and second voltage outputs associated with the RC circuit and corresponding to a voltage proportion to a voltage across the inductor when the electronic power converter circuit is operating; a current source circuit; a current steering circuit comprising first and second matched active elements each connected to the current source circuit and to the first and second voltage outputs, each of the first and second active elements configured to receive a current from the current source circuit and provide a current output that is responsive to the first and second voltage outputs; and a level shift circuit receiving the output from each of the first and second matched active elements.

Optionally, the RC circuit may include a pair of resistors and a capacitor connected in between the pair of resistors. The first and second matched active elements may include first and second transistors. The level shift circuit may include a differential amplifier configured to provide the output signal based on the voltages associated with the respective output currents of the first and second active elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical power converter comprising:
   power converter circuitry including an inductor, wherein the inductor is not referenced to electrical ground; and a current sensing circuit connected to the inductor, the current sensing circuit comprising:
      at least one element arranged to have a voltage proportional to a voltage across the inductor when the power converter circuitry is operating;
      first and second voltage outputs associated with the at least one element;
      a current source circuit;
      a current steering circuit comprising first and second matched active elements each connected to the current source circuit and to the first and second voltage outputs, each of the first and second active elements configured to receive a current from the current source circuit and provide a current output that is responsive to the first and second voltage outputs; and
      a level shift circuit receiving the output from each of the first and second matched active elements and configured to provide an output signal that is referenced to ground, the output signal being proportional to a current flowing between the inductor and an electrical load.

2. The power converter of claim 1, wherein the at least one element comprises an RC circuit connected in parallel with the inductor.

3. The power converter of claim 2, wherein the RC circuit comprises a pair of resistors and a capacitor connected in between the pair of resistors.

4. The power converter of claim 3, wherein the first and second voltage outputs are associated with the capacitor.

5. The power converter of claim 3, wherein the first and second resistors are matched to one another.

6. The power converter of claim 1, wherein the current source circuit comprises a current source and a regulator.

7. The power converter of claim 6, wherein the current source comprises a general purpose transistor.

8. The power converter of claim 1, wherein the first and second matched active elements comprises first and second transistors.

9. The power converter of claim 8, wherein the first and second transistors comprise first and second PNP transistors.

10. The power converter of claim 8, wherein the level shift circuit includes a differential amplifier configured to provide the output signal based on the voltages associated with the respective output currents of the first and second matched active elements.

11. The power converter of claim 1, wherein the power converter circuitry is configured as a direct current to direct current (DC to DC) converter.

12. The power converter of claim 1, wherein the power converter circuitry is configured as an alternating current to direct current (AC to DC) converter.

13. The power converter of claim 1, wherein the power converter circuitry is configured as one of a boost converter, a buck converter and a fly-back converter.

14. An electrical power system for powering an electrical load from a power supply comprising:
   power converter circuitry configured to convert electrical energy supplied to the power converter circuitry from the power supply in a first form to a second form to be supplied to a load, the power converter circuitry including an inductor connected to the power converter circuitry, wherein the inductor is not referenced to electrical ground;
   at least one load connected to the inductor; and
   a current sensing circuit configured to provide an output signal proportional to current flowing between the inductor and the load, the output signal being referenced to ground, the current sensing circuit comprising:
      first and second voltage outputs associated with at least one element having a voltage proportional to the voltage across the inductor when the power converter circuit is operating;
      a current source circuit;
      a current steering circuit comprising first and second matched active elements each connected to the current source circuit and to the first and second voltage outputs, each of the first and second active elements configured to receive a current from the current source circuit and provide a current output that is responsive to the first and second voltage outputs; and
      a level shift circuit receiving the output from each of the first and second matched active elements.

15. The electrical power system of claim 14, wherein the at least one element comprises an RC circuit connected in parallel with the inductor.

16. The electrical power system of claim 15, wherein the RC circuit comprises a pair of resistors and a capacitor connected in between the pair of resistors.

17. The electrical power system of claim 16, wherein the first and second voltage outputs are associated with the capacitor.

18. The electrical power system of claim 16, wherein the first and second resistors are matched to one another.

19. The electrical power system of claim 14, wherein the current source circuit comprises a current source and a regulator.

20. The electrical power system of claim 19, wherein the current source comprises a general purpose transistor.

21. The electrical power system of claim 14, wherein the first and second matched active elements comprises first and second transistors.

22. The electrical power system of claim 21, wherein the first and second transistors comprise first and second PNP transistors.

23. The electrical power system of claim 21, wherein the level shift circuit includes a differential amplifier configured to provide the output signal based on the voltages associated with the respective output currents of the first and second matched active elements.

24. The electrical power system of claim 14, wherein the power converter circuitry is configured to convert as a direct current (DC to DC) converter.

25. The electrical power system of claim 14, wherein the power converter circuitry is configured as an alternating current to direct current (AC to DC) converter.

26. The electrical power system of claim 14, wherein the converter circuitry is configured as one of a boost converter, a buck converter and a fly-back converter.

27. An electrical power system for supplying power to a load, the electrical power system comprising:
- an electronic power converter circuit configured to convert one of direct current to direct current (DC to DC) power or alternating current to direct current (AC to DC) power, the electronic power converter circuit including an inductor that is not referenced to electrical ground, and the electronic power circuit further configured as one of a boost converter, a buck converter and a fly-back converter; and
- a current sensing circuit configured to provide an output signal proportional to current flowing between the inductor and the load, the output signal being referenced to ground, the current sensing circuit comprising:
    - an RC circuit connected in parallel with the inductor, and first and second voltage outputs associated with the RC circuit and corresponding to a voltage proportional to a voltage across the inductor when the electronic power converter circuit is operating;
    - a current source circuit;
    - a current steering circuit comprising first and second matched active elements each connected to the current source circuit and to the first and second voltage outputs, each of the first and second active elements configured to receive a current from the current source circuit and provide a current output that is responsive to the first and second voltage outputs; and
    - a level shift circuit receiving the output from each of the first and second matched active elements.

28. The electrical power system of claim 27, wherein the RC circuit comprises a pair of resistors and a capacitor connected in between the pair of resistors.

29. The electrical power system of claim 27, wherein the first and second matched active elements comprises first and second transistors.

30. The electrical power system of claim 27, wherein the level shift circuit includes a differential amplifier configured to provide the output signal based on the voltages associated with the respective output currents of the first and second active elements.

* * * * *